United States Patent
Collins et al.

(10) Patent No.: US 10,267,941 B2
(45) Date of Patent: Apr. 23, 2019

(54) ESTIMATE OF FORMATION MOBILITY FROM STONELEY WAVEFORMS

(71) Applicant: Halliburton Energy Services, Inc., Houston, TX (US)

(72) Inventors: Mark V. Collins, Houston, TX (US); Arthur Cheng, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 484 days.

(21) Appl. No.: 14/771,311

(22) PCT Filed: Jun. 24, 2014

(86) PCT No.: PCT/US2014/043859
§ 371 (c)(1),
(2) Date: Aug. 28, 2015

(87) PCT Pub. No.: WO2015/199657
PCT Pub. Date: Dec. 30, 2015

(65) Prior Publication Data
US 2016/0363683 A1 Dec. 15, 2016

(51) Int. Cl.
*G01V 1/50* (2006.01)

(52) U.S. Cl.
CPC .......... *G01V 1/50* (2013.01); *G01V 2210/614* (2013.01); *G01V 2210/6246* (2013.01); *G01V 2210/67* (2013.01)

(58) Field of Classification Search
CPC .......... G01V 1/50; G01V 2210/6246
See application file for complete search history.

(56) References Cited

U.S. PATENT DOCUMENTS

| 5,687,138 A | 11/1997 | Kimball |
| 5,708,204 A * | 1/1998 | Kasap .................. E21B 49/008 73/152.05 |
| 5,784,333 A | 7/1998 | Tang et al. |
| 6,327,538 B1 * | 12/2001 | Chin ...................... G01V 1/50 702/14 |
| 2009/0145600 A1 | 6/2009 | Wu et al. |
| 2013/0146282 A1 | 6/2013 | Toms et al. |
| 2017/0075021 A1 * | 3/2017 | Thiel ...................... G01V 3/38 |

FOREIGN PATENT DOCUMENTS

EP    0526501 A1    2/1993

OTHER PUBLICATIONS

"International Application Serial No. PCT/US2014/043859, International Search Report dated Mar. 30, 2015", 3 pgs.
"International Application Serial No. PCT/US2014/043859, Written Opinion dated Mar. 30, 2015", 11 pgs.

(Continued)

*Primary Examiner* — Elias Desta (57) ABSTRACT

Various embodiments include apparatus and methods to estimate formation mobility from Stoneley waveforms. An objective function can be generated that represents misfit between measured Stoneley pressure values and synthetic pressure values. A minimization process can be applied to the objective function to estimate formation mobility and intrinsic attenuation. Additional apparatus, systems, and methods are disclosed.

24 Claims, 7 Drawing Sheets

(56) References Cited

OTHER PUBLICATIONS

European Patent Office, Supplementary European Search Report, dated Nov. 2, 2017, 8 pages, Europe.
W. Canady, P. Spooner, and R. Vasquez, Permeability Estimation From Stoneley Amplitude, Corrected for Borehole Geometry and Rugosity, Society of Petroleum Engineers, Oct. 9-12, 2005, 6 pages, SPE 96598, SPE Annual Technical Conference and Exhibition, Dallas, Texas.
Takeshi Endo and Hiroaki Yamamoto, Evaluation of Formation Mobility Using Borehole Stoneley Waves, Oct. 12-14, 2009, 4 pages, Proceedings of the $9^{th}$ SEGJ International Symposium-Imaging and Interpretation, Sapporo, Japan.

\* cited by examiner

Fig. 1A

| Compressional Slowness | 100 µs/ft |
| --- | --- |
| Shear Slowness | 180 µs/ft |
| Borehole Fluid Slowness | 200 µs/ft |
| Borehole Fluid Density | 1 g/cc. |
| Borehole Diameter | 6 in. |
| Tool Diameter | 3.625 in. |
| Pore Fluid Density | 1 g/cc. |
| Pore Fluid Bulk Modulus | 2.25e9 Pa. |
| Grain Bulk Modulus | 37.9e9 Pa. |
| Grain Density | 2.65 g/cc. |
| Bulk Density | 2.3 g/cc. |
| Tortuosity | 3 |

ESTIMATE OF FORMATION MOBILITY FROM STONELEY WAVEFORMS

TECHNICAL FIELD

The present invention relates generally to apparatus and methods related to measurements and analysis of data with respect to oil and gas exploration.

BACKGROUND

Permeability is one of the key parameters in determining oil well productivity and optimizing reservoir management. Conventional techniques such as core sample evaluation in the lab or intermittent-sampling formation testing tools are slow and expensive. These methods are also impractical for providing a continuous permeability profile as a function of depth. Furthermore lab measurements of core samples in the lab can be inaccurate due to core damage. Measurement of permeability from acoustic data is one method of circumventing these difficulties, and numerous patents describing methods of estimating permeability from Stoneley waves have been published over the last several decades. All of these methods rely on the fact that Stoneley waves are attenuated and slowdown in permeable formations relative to impermeable ones due to slow P-wave coupling, and this effect can be quantified via a full or simplified Biot-Rosenbaum theory using specified boundary conditions, as noted in various articles.

Unfortunately, measurement of permeability from Stoneley wave data suffers from its own difficulties. As early as 1987, permeability was estimated from Stoneley wave slowness. See, for example, U.S. Pat. No. 4,797,859. However, the effect of low permeabilities on slowness is generally very small and easily obscured by uncertainties in other parameters. See, for example, X. M. Tang, A. Cheng, "Quantitative Borehole Acoustic Methods", Handbook of Geophysical Exploration: Seismic Exploration, pp. 109-155, Vol. 24, 2004. It has been reported that Stoneley wave velocity is least sensitive to permeability. In order of importance, it has also been reported that Stoneley wave velocity is more sensitive to borehole mud velocity, shear velocity, and borehole size, and is least sensitive to permeability. See, for example, U.S. Pat. No. 7,830,744. Conversely, the Stoneley wave attenuation, as measured by inverse quality factor, is most sensitive to permeability. However, attenuation due to permeability can be masked by intrinsic attenuation and reflections due to borehole irregularities and formation heterogeneity. See, for example, X. M. Tang, A. Cheng, "Quantitative Borehole Acoustic Methods", Handbook of Geophysical Exploration: Seismic Exploration, pp. 109-155, Vol. 24, 2004. Intrinsic attenuation is attenuation of the rock matrix that is not due to permeability. Several methods have been developed over the years attempting to address these issues.

A Biot model using an elastic membrane impedance model to account for mud cake has been developed, but did not consider intrinsic attenuation or reflections. See U.S. Pat. No. 4,964,101. Based on a modified version of U.S. Pat. No. 4,964,101, corrections for reflections have been considered by windowing the Stoneley wave based on its approximate arrival time. See U.S. Pat. No. 5,687,138. However this may not eliminate nearby reflections overlapping the direct Stoneley arrival. Velocity and intrinsic attenuation of the borehole fluid (but not of the formation) were determined by inversion over an impermeable region of the well. No correction was made for intrinsic attenuation of the formation. Corrections for reflections have been considered by using various two-mode frequency semblance methods, which did not consider the effect of intrinsic attenuation. See U.S. Pat. No. 5,331,604. Corrections for intrinsic attenuation have been considered using an empirical shale relationship and measurement of mud attenuation in a non-permeable clean sand. See U.S. Pat. No. 7,830,744 in which handling of reflections by time-frequency filtering and wave separation, if necessary, is suggested without providing details.

In U.S. Pat. No. 5,784,333, wave separation and synthetic one-dimensional (1-D) modeling of the corresponding effective elastic formation are used to correct for reflections, and a two-dimensional (2-D) inversion over permeability and intrinsic attenuation uses a simplified Biot model. This inversion requires knowledge of the transmitter-receiver response function, and uses an estimate of transmitter-receiver response at a depth of low or known permeability. The inversion estimates attenuation across the entire aperture from transmitter to receiver. A finer depth resolution is achieved in post processing by estimating the attenuation only across the receiver array. However, errors may exist in the estimate of the transmitter-to-receiver response functions used, which may affect the attenuation measurement.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1A:
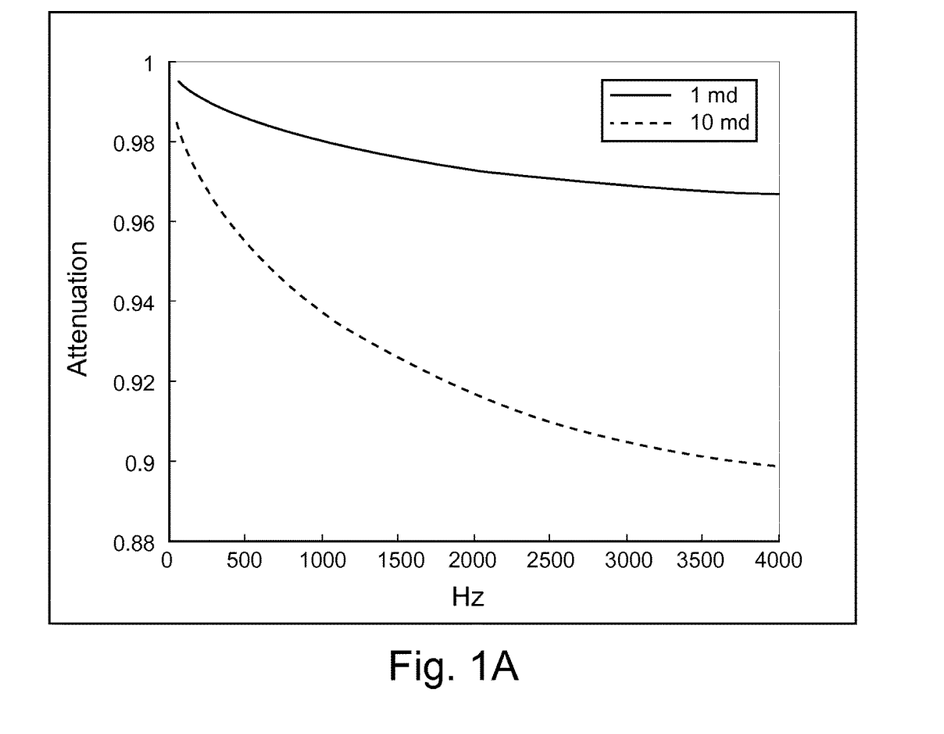
FIGS. 1A-B shows an example of attenuation due to permeability with respect to parameters shown, according to various embodiments.
Figure 1B:
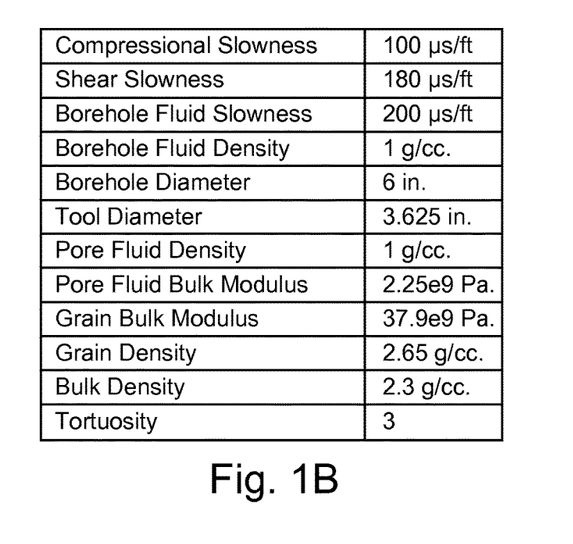

One issue not sufficiently addressed, in analysis as is currently performed or previously presented, is the effect of error in the estimate of the transmitter-to-receiver response functions on the attenuation measurement. In the currently performed or previously presented approaches, a mathematical model with perfectly balanced receivers is assumed when estimating the attenuation across the receiver array. FIG. 1A shows an example of attenuation due to permeability. In FIG. 1A, the physical attenuation (exponential decay) due to permeability is shown across a 3.5 ft. receiver array for permeabilities of 1 millidarcy (mD) and 10 mD, using the simplified Biot model with parameters shown in FIG. 1B. A linear drift of receiver gain across the array of 5% would introduce errors of the same magnitude, as low (<0.01 darcy (D)) permeability attenuation. A larger random receiver drift of 10-20% due to aging of the tool would cause similar problems.

Furthermore, the gain imbalances may be frequency dependent. Attenuation due to permeability has different frequency dependence than intrinsic attenuation and is stronger at low frequencies. This makes it mathematically possible to invert for both intrinsic attenuation and permeability from the Stoneley mode. However, unknown receiver gain imbalances will affect the inversion.

In various embodiments, an objective function is minimized, where the objective function represents the misfit of the measured Stoneley pressure in a 2-D depth-receiver array and synthetic pressures computed for a test permeability and intrinsic attenuation. Synthetic refers to theoretical prediction of Stoneley pressure waves at the receivers based on measured or assumed properties (such as shear and compressional slowness, borehole radius, bulk moduli of pore fluid and rock matrix, rock density, borehole mud properties) and an inversion variable (mobility). Mobility is given by permeability (typically measured in darcy) divided by viscosity (typically measured in Pa-s). It is a measure of how easily a fluid (characterized by the viscosity) can flow through a porous rock (characterized by the permeability). Poro-elastic wave theory equations use the mobility. It is customary to refer to measuring permeability, however, in various embodiments, inverting can be preformed for mobility followed with permeability determined if the viscosity is known. Permeability may be computed based on an assumed viscosity.

An objective function is a relationship to be optimized according to constraints, where variables of the relationship are to be minimized or maximized. The minimization or maximization may be conducted using nonlinear computer-based techniques. The 2-D depth-receiver array can be provided by a plurality of receivers at each of a plurality of planes along a length of the tool, where each plane is at a different depth.

Synthetic modeling refers to computation of synthetic waveforms based on a particular method. In various embodiments, the modeling can use a 1D layered model with the modeled formation layers perpendicular to the borehole. Processing can solve for the up and down reflection coefficients in each layer to determine the synthetic waveforms at the receivers. The synthetic modeling, providing the synthetic pressures, can include the effect of reflections in the objective function. Sensitivity can be enhanced by stacking over all depth-receiver combinations. Reflection coefficients can be optimized analytically for the stacked objective function to improve execution time. In addition, the objective function can include individual transmitter-receiver response functions.

Figure 2A:
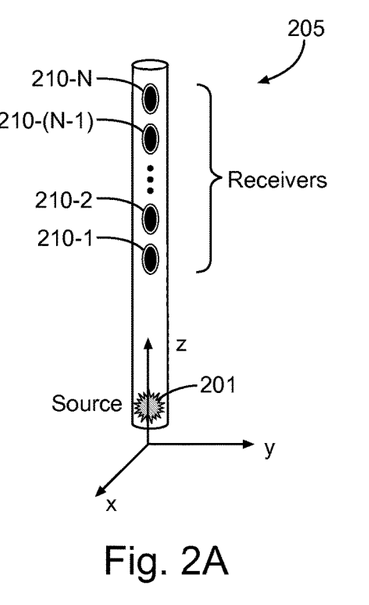
FIGS. 2A-2D show representations of an example acoustic logging tool, according to various embodiments.
Figure 2B:
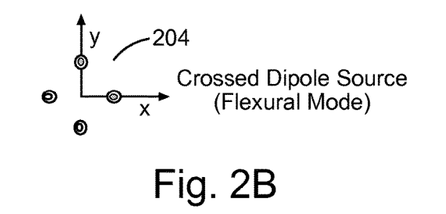
Figure 2C:
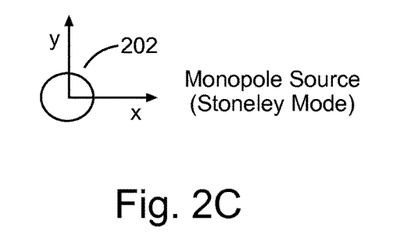

FIGS. 2A-2D show representations of an example acoustic logging tool 205. FIG. 2A is a schematic diagram of the acoustic logging tool 205 having axial arrays of receivers 210-1, 210-2 . . . 210-(N−1), 210-N, where each of the axial arrays of receivers 210-1, 210-2 . . . 210-(N−1), 210-N can include a number of receivers. The tool acoustic logging tool 205 can include a source 201. The source 201 and the axial arrays of receivers 210-1, 210-2 . . . 210-(N−1), 210-N may be disposed along an axis of the acoustic logging tool 205 such as along the z-axis in FIG. 2A. The source 201 may include a number of sources such as a crossed-dipole source 204, shown in FIG. 2B, and a monopole source 202, shown in FIG. 2C. FIG. 2B is a top view of the acoustic logging tool 205 with respect to the crossed-dipole source 204 for generating a flexural wave, where the elements of the crossed-dipole source 204 are in the x-y plane at a location along the z-axis. FIG. 2C is a top view of the acoustic logging tool 205 with respect to the monopole source 202 for generating a Stoneley wave, where the monopole source 202 is in the x-y plane at a location along the z-axis. The crossed-dipole source 204, shown in FIG. 2B, and the monopole source 202, shown in FIG. 2C, may be separated from each other along the z-axis or the crossed-dipole source 204, shown in FIG. 2B, and the monopole source 202, shown in FIG. 2C, may be co-located at a position along the z-axis.

Figure 2D:
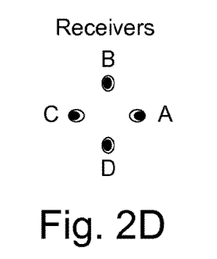

In response to firing the source 201, waveforms are recorded along the axial arrays of receivers 210-1, 210-2 . . . 210-(N−1), 210-N spaced uniformly along the z-axis as shown in FIG. 2A. At each axial position along the z-axis, each of the axial arrays of the receivers 210-1, 210-2 . . . 210-(N−1), 210-N can have a number of receivers. For an example of an axial array having four receivers at a location along the z-axis, the four receivers can be disposed at equally spaced azimuthal positions. FIG. 2D is a top view of the acoustic logging tool 205 with respect to axial arrays having four receivers at equally spaced azimuthal positions, where the receivers are denoted as A, B, C, and D. With a plurality of receivers at each axial position and with a plurality of axial positions, the logging tool 205 can be considered to have a 2-D receiver array.

When the monopole source 202 is fired, the waveforms are summed over the azimuthal positions to create a monopole waveform at each axial position. Besides the Stoneley wave used to detect permeability, the monopole waveform typically includes a compressional wave. A shear wave and possibly a pseudo-Rayleigh wave occur in fast formations. When the X or Y directed dipole source of crossed-dipole source 204 is fired, the inline azimuthal receivers are differenced to create flexural waves at each axial position used to estimate the shear velocity (or equivalently slowness) of the formation.

Standard processing of the signals consists of estimating the slowness of the various modes in the waveforms using time and/or frequency semblance algorithms known to those skilled in the art. Slowness parameters for estimating permeability can include the compressional slowness, shear slowness, and mud slowness. The compressional slowness may be determined from time-semblance processing of the monopole signal. The shear slowness may be determined from frequency-semblance processing of the dipole signal. The mud slowness may be estimated by an empirical formula such as the Wood formula, measured directly using an acoustic tool, or measured indirectly by inversion of Stoneley and flexural waveforms in a low permeability section of the well. Mud slowness is an important parameter if the Stoneley slowness is used in the inversion for permeability.

Other parameters, which may be assumed to be available from logs, include borehole radius, mud density, and lithology (density and bulk modulus of the grain and pore fluids, and porosity or equivalently bulk density).

Figure 3:
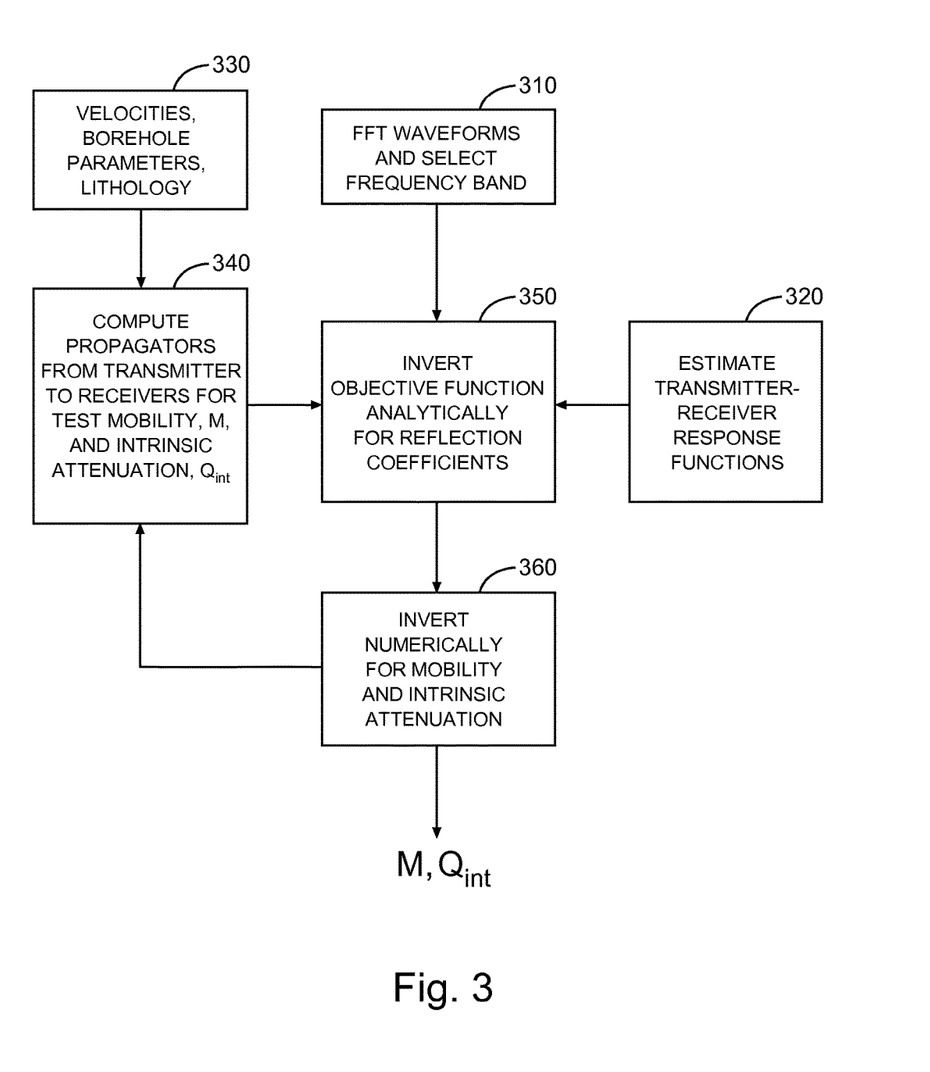
FIG. 3 shows features of an example processing flow diagram for permeability estimation from Stoneley waves, according to various embodiments.

FIG. 3 shows features of an example of an embodiment of a processing flow diagram for permeability estimation from Stoneley waves. First the monopole waveforms are preprocessed to filter out extraneous modes and retain the Stoneley wave using methods known to those skilled in the art. This may be performed, at 310, by Fourier transforming the waveforms and selecting a low frequency band, typically, from several hundred Hz up to a few KHz for further processing.

At 320, estimates of the receiver response functions are computed for each receiver in an impermeable region of the well or a region with known mobility. The known mobility may be determined from core data, NMR data, or empirical methods based on lithology such as Timur's equation. It may be assumed that a known mobility calibrates the Stoneley permeability algorithm with respect to the external permeability measurement. One method for estimating the transmitter receiver response functions, assuming they are well balanced and the permeability is known, is described in reference, X. M. Tang, A. Cheng, "Quantitative Borehole Acoustic Methods", Handbook of Geophysical Exploration: Seismic Exploration, pp. 138, Vol. 24, 2004. Part of this method involves separating the up reflections and direct wave from the down reflections using common transmitter wave separation. This method mixes the response of the receivers. If the receivers are not balanced, three component wave separation on the depth array can be used to separate the direct wave from the up and down reflections for each individual receiver. Then, comparison to synthetic modeling makes it possible to estimate the individual receiver gains in a fashion similar to reference, X. M. Tang, A. Cheng, "Quantitative Borehole Acoustic Methods", Handbook of Geophysical Exploration: Seismic Exploration, pp. 138, Vol. 24, 2004.

Compressional and shear velocities from logs, borehole parameters, and lithology, obtained at 330, are used to compute propagators, at 340, from the transmitter to the receivers for a 2-D depth-receiver array given a test permeability and test intrinsic attenuation. A propagator is a matrix (for example, a 2×2 matrix) relating the up and down wave reflection coefficients in a selected layer in the processing to the up and down wave reflection coefficients in the next layer. The matrix can be determined by the layer properties as described in theoretical prediction of Stoneley pressure waves at the receivers mentioned above. The propagator along with boundary conditions at the top and bottom layer can be used to solve the synthetic model. The transmitter-receiver response functions and propagators are used to compute synthetic waveforms for the 2-D waveform array as a function of the forward and backward reflection coefficients. The Fourier transformed 2-D waveform data array and the synthetic waves can be used to compute an objective function. At 350, the objective function can be minimized analytically with respect to the forward and backward reflection coefficients for the given test mobility and intrinsic attenuation. The test mobility and intrinsic attenuation are changed, at 360, and the process is repeated until the objective function is minimized. The values that minimize the objective function are reported as the mobility and intrinsic attenuation of the formation. The following sections describe processing flow components in greater detail.

In calculation of synthetic 2-D array waveforms, propagators can be computed using a 1-D fast forward method. Examples of such methods can be found, for example, in Tang, X. M., 1996b, Fracture hydraulic conductivity estimation from borehole Stoneley wave transmission and reflection data, paper HH, in 37$^{th}$ Annual Logging Symposium Transactions: Society of Professional Well Log Analysts; Tezuka, K., Cheng, C. H., and Tang X. M., 1997, Modeling of low frequency Stoneley-wave propagation in an irregular borehole: Geophysics 62, 1047-1058; and Gelinsky, S. and Tang, X. M., 1997, Fast forward modeling of Stoneley waves for irregular boreholes and heterogeneous formations, 67$^{th}$ Ann Internat. Mtg: Soc. Of Expl. Geophys., 317-320.

Figure 4:
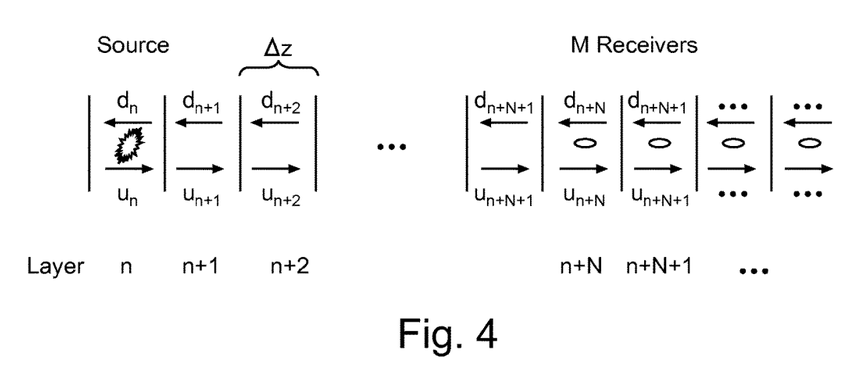
FIG. 4 illustrates transmission and reflection coefficients as up and down pressure coefficients with respect to a number of layers, according to various embodiments.

FIG. 4 illustrates transmission and reflection coefficients as up and down pressure coefficients with respect to a number of layers. Given the up and down pressure coefficients shown in FIG. 4, the pressure, $p_{nm}$, at receiver m for a source in layer n can be expressed as $$p_{nm} = R_m(\omega)[1 \ \ 1] \cdot Z^{1/2}_{n+N+m} \begin{bmatrix} u_{n+N+m} \\ d_{n+N+m} \end{bmatrix} \quad (1)$$

$$= TR_m(\omega)[1 \ \ 1] \cdot Z^{1/2}_{n+N+m} \left\{ \prod_{l=2}^{N+m} G_{n+l} Z_{n+l-1} \right\} \cdot \begin{bmatrix} u_{n+1} \\ d_{n+1} \end{bmatrix}$$

$$= TR_m[g_u(Q_n, sa_{nm})u_n + g_d(Q_n, sa_{nm})d_n + g(Q_n, sa_{nm})]$$

with $$\begin{bmatrix} u_{n+1} \\ d_{n+1} \end{bmatrix} = G_{n+1} Z^{1/2}_n \begin{bmatrix} u_n \\ d_n \end{bmatrix} + e^{jk_n \Delta z/2} E(\omega, k_n) \vec{v}_n. \quad (2)$$

In equations (1) and (2), the up and down pressure coefficients for the source layer are referenced to the source position, and in other layers they are referenced to the near boundary of the layer. The source and receivers are centered in the layers. Though the equations assume uniform layer thickness of $\Delta z$, it is straight forward to generalize the method to variable layer thickness as well. This improves the accuracy of the inversion when the tool is firing at variable depth increments. In equation (1), the diagonal propagator Z for layer n is defined as $$Z_n = \begin{bmatrix} e^{jk_n \Delta z} & 0 \\ 0 & e^{-jk_n \Delta z} \end{bmatrix}, \quad (3)$$

where $k_n$ is the permeable Stoneley wavenumber for layer n including intrinsic attenuation. The combined effect of attenuation due to permeability and intrinsic attenuation is denoted by quality factor $Q_n$. The term $sa_{nm}$ is the set of layer slownesses and borehole radii for the layers between and including the source and receiver m. $TR_m$ is the transmitter-receiver response function for receiver m, and E is the borehole excitation function. The terms $g_u$, $g_d$, and g are the transmitter-to-receiver propagators for the up reflections, down reflections, and direct wave respectively. The propagator G and source vector 17 are functions of neighboring Stoneley wavenumbers and borehole radii.

The form of G and $\vec{v}$ can be derived for elastic fast formations using a mass balance boundary condition, according to Tezuka, K., Cheng, C. H., and Tang X. M., 1997, Modeling of low frequency Stoneley-wave propagation in an irregular borehole: Geophysics 62, 1047-1058, and for a slow formation the integrals of Gelinsky, S. and Tang, X. M., 1997, Fast forward modeling of Stoneley waves for irregular boreholes and heterogeneous formations, 67th Ann Internat. Mtg: Soc. Of Expl. Geophys., 317-320. See for example X. M. Tang, A. Cheng, "Quantitative Borehole Acoustic Methods", Handbook of Geophysical Exploration: Seismic Exploration, pp. 109-155, Vol. 24, 2004. For a fast elastic formation, G and $\vec{v}$ are given by $$G_{n+1} = \frac{1}{2}\begin{bmatrix} 1 + \frac{A_n k_{e,n}}{A_{n+1} k_{e,n+1}} & 1 - \frac{A_n k_{e,n}}{A_{n+1} k_{en+1}} \\ 1 - \frac{A_n k_{e,n}}{A_{n+1} k_{e,n+1}} & 1 + \frac{A_n k_{e,n}}{A_{n+1} k_{e,n+1}} \end{bmatrix}, \quad (4)$$

and $$\vec{v}_n = \frac{1}{2}\begin{bmatrix} 1 + \frac{A_n k_{e,n}}{A_{n+1} k_{e,n+1}} \\ 1 - \frac{A_n k_{e,n}}{A_{n+1} k_{e,n+1}} \end{bmatrix}, \quad (5)$$

where $k_{e,n}$ is the effective elastic Stoneley wavenumber for an isotropic formation, and $A_n$ is the borehole fluid annulus area in layer n. This wavenumber is known from measurement of the dispersion corrected flexural mode slowness, which is insensitive to permeability, and from solving for the theoretical Stoneley wavenumber including tool effects as a function of frequency using methods known in the art. See for example X. M. Tang, A. Cheng, "Quantitative Borehole Acoustic Methods", Handbook of Geophysical Exploration: Seismic Exploration, p. 31-64, Vol. 24, 2004.

Figure 5:
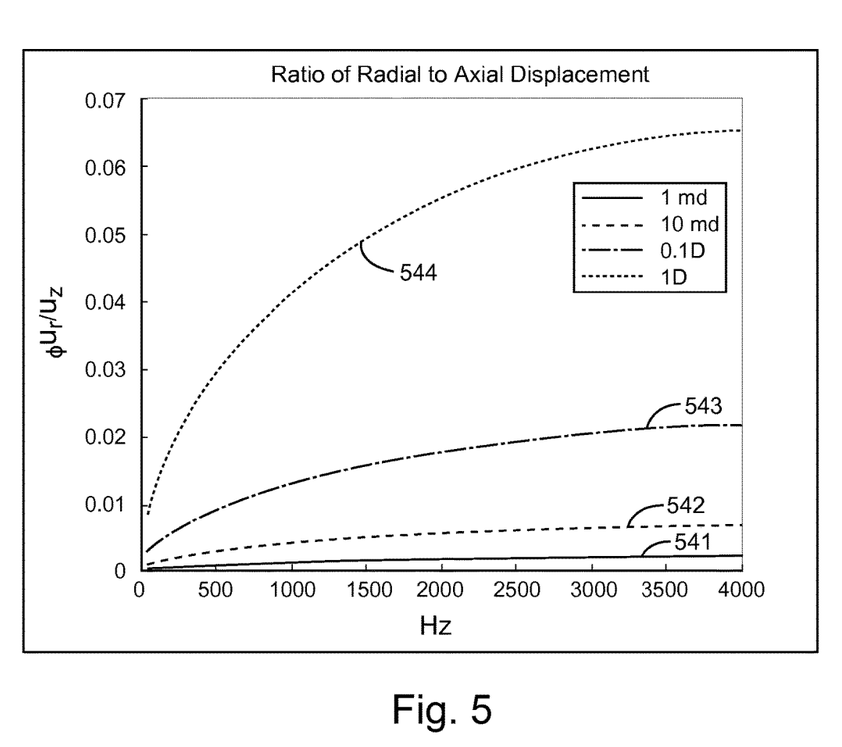
FIG. 5 shows a plot of displacement ratios vs. frequency, according to various embodiments.

FIG. 5 shows plots of displacement ratios vs. frequency. In FIG. 5, the ratio of the product of radial displacement and porosity to axial displacement was generated using the simplified Biot model for different permeabilities assuming the pore fluid is water. See X. M. Tang, A. Cheng, "Quantitative Borehole Acoustic Methods", Handbook of Geophysical Exploration: Seismic Exploration, pp. 109-155, Vol. 24, 2004. Curve 541 is for permeability of 1 mD. Curve 542 is for permeability of 10 mD. Curve 543 is for permeability of 0.1 D. Curve 544 is for permeability of 1 D. The ratio is much less than unity even for large permeabilities. This suggests the lowest order correction to equations (4) and (5) is the replacement of $k_{e,n}$ by $k_n$ as was performed for low-frequency tube waves in reference, Moos, D. and Quan, Y., "Methods and devices for analyzing and controlling the propagation of waves in a borehole generated by water hammer", U.S. Pat. No. 7,313,481 B2, Dec. 25, 2007. $k_n$ is related to the permeable Stoneley wave number, $k_{st}$, and the intrinsic permeability, $Q_i$, by $$k_n \approx k_{st}\left(1 + \frac{iQ_{i,n}^{-1}}{2}\right). \quad (6)$$

The borehole excitation function is given by $$E(\omega, k_n) = E_e(\omega, k_{e,n})(k_{e,n}/k_n), \quad (7)$$

See X. M. Tang, A. Cheng, "Quantitative Borehole Acoustic Methods", Handbook of Geophysical Exploration: Seismic Exploration, pp. 109-155, Vol. 24, 2004. The effect of permeability on the Stoneley wavenumber is found by solving the Biot-Rosenbaum equations or the simplified Biot model using the lithology parameters and an assumed static mobility, $M = \kappa_0/\eta$, where $\kappa_0$ is the static permeability and $\eta$ is the viscosity of the pore fluid. A detailed description of both methods can be found in reference, X. M. Tang, A. Cheng, "Quantitative Borehole Acoustic Methods", Handbook of Geophysical Exploration: Seismic Exploration, pp. 109-155, Vol. 24, 2004.

An objective function can be defined by the following L2 norm as a function of the reflection coefficients:

$$L2 = \sum_{m,n,\omega} |p_{nm} - TR_m[g_u(Q_n, sa_{nm})u_n + g_d(Q_n, sa_{nm})d_n + g(Q_n, sa_{nm})]|^2 \qquad (8)$$

$$P(\omega)W(\omega) +$$

$$\sum_{\substack{m,m', \\ n,n',\omega}} \left| p_{nm}TR_{m'}\begin{bmatrix} g_u(Q_{n'}, sa_{n'm'})u_{n'} + \\ g_d(Q_{n'}, sa_{n'm'})d_{n'} + g(Q_{n'}, sa_{n'm'}) \end{bmatrix} - p_{n'm'}TR_m\begin{bmatrix} g_u(Q_n, sa_{nm})u_n + \\ g_d(Q_n, sa_{nm})d_n + g(Q_n, sa_{nm}) \end{bmatrix}\right|^2 W(\omega).$$

The first term sums over all points in the 2-D depth-receiver array. The second term is a cross-correlation term summed over all pairs of points in the 2-D depth-receiver array. The summations are used to reduce the effect of noise. The first term is scaled so that the first and second terms have almost equal importance in the objective function. The scaling is provided by a normalization factor that is defined by $$P(\omega) = \sum_{nm} |p_{nm}(\omega)|^2. \quad (9)$$

The weighting $W(\omega)$ is used to adjust the relative importance of different frequencies. In order to speed up execution time, the objective function is minimized with respect to the reflection coefficients analytically, resulting in the following matrix equation:

$$\begin{bmatrix} A^{uu} & A^{ud} \\ A^{du} & A^{dd} \end{bmatrix}\begin{bmatrix} \vec{u} \\ \vec{d} \end{bmatrix} = \begin{bmatrix} \vec{b}^u \\ \vec{b}^d \end{bmatrix}, \quad (10)$$

where, in the following $\delta_{kn}$ is the Kronicker delta function, H is the Hermitian conjugate operator, and summation is implied over all indices except k and n, $$A_{kn}^{uu} = 3P|TR_m|^2(|g_{km}^u|^2)\delta_{kn} - 2TR_m^* TR_m p_{km} p_{nm}^* g_{km}^{u*} g_{nm}^u, \quad (11)$$

$$A_{kn}^{dd} = 3P|TR_m|^2(|g_{km}^d|^2)\delta_{kn} - 2TR_m^* TR_m p_{km} p_{nm}^* g_{km}^{d*} g_{nm}^d, \quad (12)$$

$$A_{kn}^{ud} = 3P|TR_m|^2(g_{km}^{u*}g_{km}^d)\delta_{kn} - 2TR_m^* TR_m p_{km} p_{nm}^* g_{km}^{u*} g_{nm}^d, \quad (13)$$

$$A^{du} = [A^{ud}]^H, \quad (14)$$

$$b_n^u = -3P|TR_m|^2 g_{nm} g_{nm}^{u*} + + 2TR_m^* TR_m p_{nm} p_{n'm}^* g_{n'm}^{u*} g_{n'm} + PTR_m^* p_{nm} g_{nm}^{u*},$$
and $\quad (15)$ $$b_n^d = -3P|TR_m|^2 g_{nm} g_{nm}^{d*} + + 2TR_m^* TR_m p_{nm} p_{n'm}^* g_{n'm}^{d*} g_{n'm} + PTR_m^* p_{nm} g_{nm}^{d*}. \quad (16)$$

For convenience, considering the number of indexes discussed in some of these equations, the up (u) and down (d) indexes are written as superscripts.

Numerical inversion can be conducted for mobility and intrinsic attenuation. The objective function can be computed using the solution to equation (10). Then, the process previously described with respect to calculation of synthetic 2-D array waveforms is repeated for a new test mobility and intrinsic attenuation until a global minimum is found with respect to the mobility and intrinsic attenuation.

In various embodiments, techniques are provided to reduce the effect of noise when inverting for mobility from the Stoneley mode by stacking data points in the objective function. Instead of using wave separation, reflections are estimated by analytically minimizing the objective function with respect to the reflection coefficients.

Figure 6:
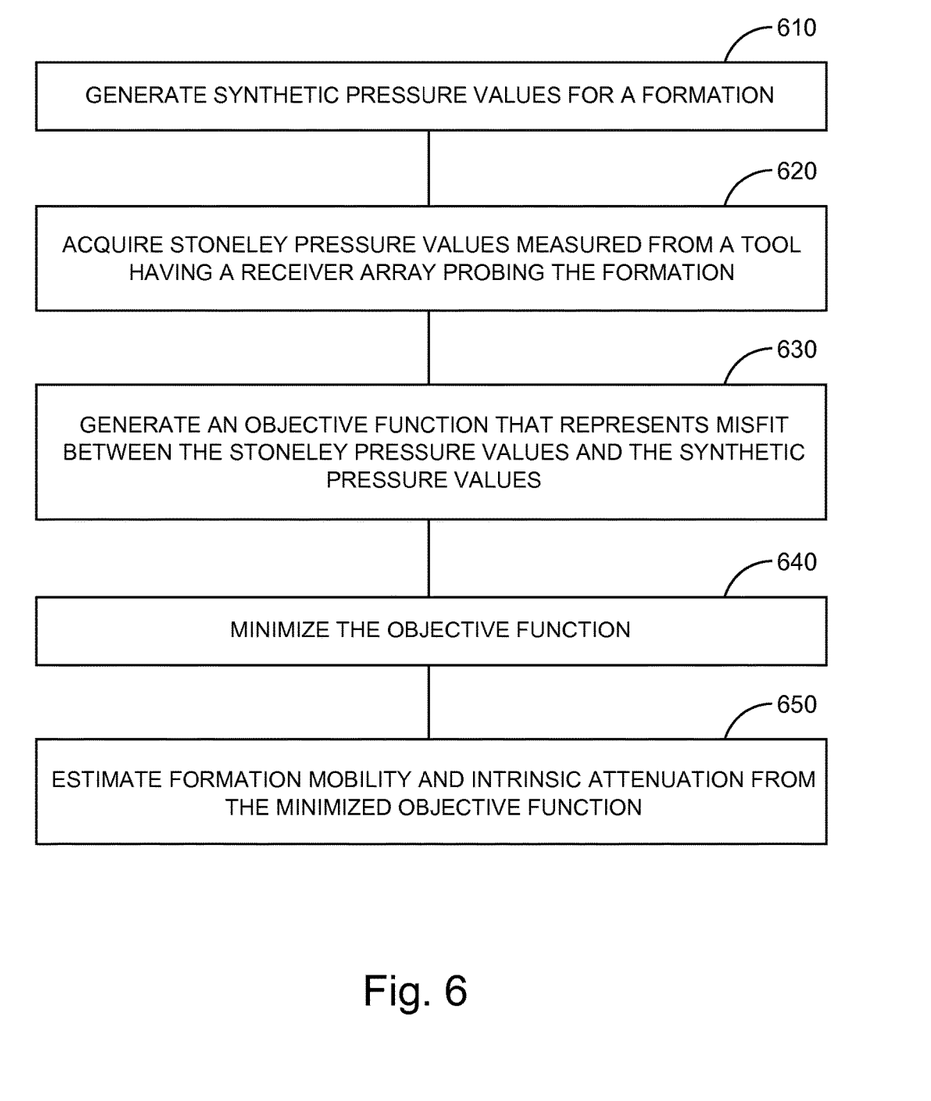
FIG. 6 shows features of an example method of estimating formation mobility from Stoneley waveforms, according to various embodiments.

FIG. 6 shows features of an embodiment of an example method to estimate formation mobility from Stoneley waveforms. At 610, synthetic pressure values for a formation are generated. Generating synthetic pressure values can include synthetic modeling over all depth-receiver combinations of a plurality of receivers, providing a stacked objective function having effects of reflections. At 620, Stoneley pressure values measured from a tool having a receiver array probing the formation are acquired. Acquiring the Stoneley pressure values can include acquiring Stoneley pressure values measured from a tool having a plurality of receivers at each of a plurality of planes along a length of the tool. Correspondingly, generating synthetic pressure values can include synthetic modeling over all depth-receiver combinations of the plurality of receivers, providing a stacked objective function having effects of reflections. Acquiring Stoneley pressure values measured from the tool can include using receivers of the plurality of receivers having different transmitter to receiver gains.

At 630, an objective function that represents misfit between the Stoneley pressure values and the synthetic pressure values is generated. At 640, the objective function is minimized. In various embodiments, a method can include analytically minimizing the objective function with respect to reflection coefficients. At 650, formation mobility and intrinsic attenuation is estimated from the minimized objective function.

In various embodiments taught herein, estimating formation mobility and intrinsic attenuation can include estimating the formation mobility and intrinsic attenuation based on different frequency dependencies of the formation mobility and intrinsic attenuation. In various embodiments taught herein, generating the objective function can include generating an L2 norm of the misfit as a function of reflection coefficients. Generating the L2 norm can include generating the L2 norm as a function of frequency.

In various embodiments, a non-transitory machine-readable storage device can comprise instructions stored thereon, which, when performed by a machine, cause the machine to perform operations, the operations comprising one or more features similar to or identical to features of methods and techniques described herein. The physical structures of such instructions may be operated on by one or more processors. Executing these physical structures can cause the machine to perform operations comprising generating synthetic pressure values for a formation; acquiring Stoneley pressure values measured from a tool having a receiver array probing the formation; generating an objective function that represents misfit between the Stoneley pressure values and the synthetic pressure values; minimizing the objective function; and estimating formation mobility and intrinsic attenuation from minimizing the objective function. Acquiring the Stoneley pressure values can include acquiring Stoneley pressure values measured from a tool has a plurality of receivers at each of a plurality of planes along a length of the tool. Generating synthetic pressure values can include synthetic modeling over all depth-receiver combinations of the plurality of receivers, providing a stacked objective function having effects of reflections. The instructions can include instructions to operate comprising analytically minimizing the objective function with respect to reflection coefficients. Acquiring Stoneley pressure values measured from the tool can include using receivers of the plurality of receivers having different transmitter to receiver gains. Estimating formation mobility and intrinsic attenuation can include estimating the formation mobility and intrinsic attenuation based on different frequency dependencies of the formation mobility and intrinsic attenuation. Generating the objective function can include generating an L2 norm of the misfit as a function of reflection coefficients. Generating the L2 norm includes generating the L2 norm as a function of frequency. The instructions can include instructions to operate a tool or tools having sensors disposed downhole in a borehole to provide data to a processing unit in accordance with the teachings herein.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

In various embodiments, a system can comprise an acoustic tool having a transmitter and an array of receivers; a control unit operable to manage generation of acoustic signals from the transmitter and to manage collection of received signals at the receivers; and a processing unit. The acoustic tool, the control unit, and the processing unit can be arranged to: generate synthetic pressure values for a formation; acquire Stoneley pressure values measured from the acoustic tool probing the formation; generate an objective function that represents misfit between the Stoneley pressure values and the synthetic pressure values; minimize the objective function; and estimate formation mobility and intrinsic attenuation from minimizing the objective function. The array of receivers can include a plurality of receivers at each of a plurality of planes along a length of the tool. The processing unit can be arranged to conduct synthetic modeling over all depth-receiver combinations of the plurality of receivers, providing a stacked objective function having effects of reflections. The processing unit can be arranged to analytically minimize the objective function with respect to reflection coefficients. Receivers of the plurality of receivers can have different transmitter to receiver gains. The processing unit can be arranged to estimate the formation mobility and intrinsic attenuation based on different frequency dependencies of the formation mobility and intrinsic attenuation. The objective function can be structured as an L2 norm of the misfit as a function of reflection coefficients. The L2 norm can be structured as a function of frequency. The processing unit can be structured to perform processing techniques similar to or identical to the techniques discussed herein. The processing unit can be configured to acquire signals from the downhole sensors, process the acquired signals, and process data related to or generated from the acquired signals. The processing unit may be arranged as an integrated unit or a distributed unit. The processing unit can be disposed at the surface of a wellbore to process the data from the downhole sensors. The processing unit be disposed in a housing unit integrated with the tool structure or arranged downhole in the vicinity of the tool structure. The processing unit may process in real time data from the downhole sensors in a manner similar to or identical to the techniques discussed herein.

Figure 7:
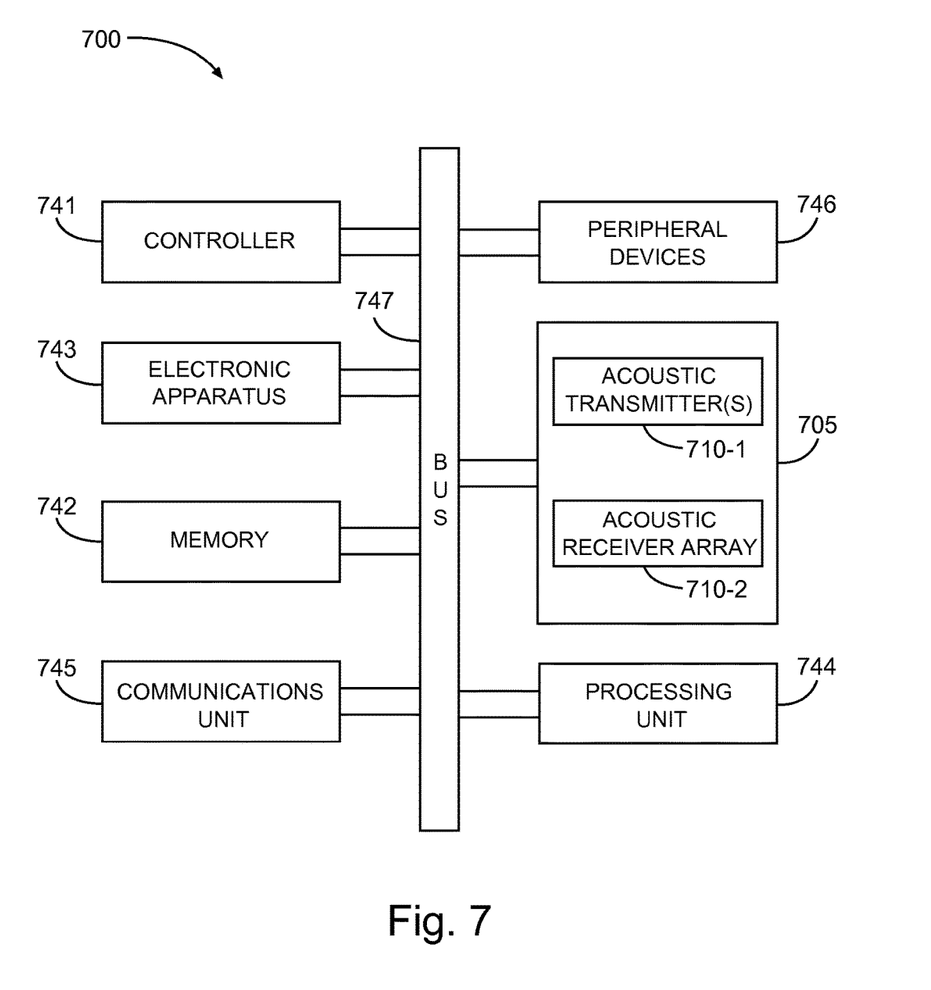
FIG. 7 depicts a block diagram of features of an example system having an acoustic tool, where the system is operable to estimate formation mobility from Stoneley waveforms, in accordance with various embodiments.

FIG. 7 depicts a block diagram of features of an example embodiment of a system 700 having an acoustic tool 705 configured with one or more acoustic transmitters 710-1 and an acoustic receiver array 710-2, where the acoustic tool 705 is operable in a borehole. The tool 705 having an arrangement of the acoustic transmitters 710-1 and the acoustic receiver array 710-2 can be realized in a similar or identical manner to arrangements of acoustic tools discussed herein. Components of the system 700 are operable to collect received signals at the acoustic receiver array 710-2 and to perform processing of the acoustic signals to estimate formation mobility from Stoneley waveforms. The system 700 can be arranged to perform various operation on the data, acquired from the acoustic receiver array 710-2, in a manner similar or identical to any of the processing techniques discussed herein.

The system 700 can include a controller 741, a memory 742, an electronic apparatus 743, and a communications unit 745. The controller 741, the memory 742, and the communications unit 745 can be arranged to operate as a processing unit to control activation of the tool 705 and to perform one or more signal and data manipulations on the signals collected by the tool 705 to analyze formation properties associated with operations in a borehole. In various embodiments, the controller 741 can be realized as a processor or a group of processors that may operate independently depending on an assigned function. A processing unit, to engage in analysis of acoustic signals and to perform processing of the acoustic signals to estimate formation mobility from Stoneley waveforms, can be distributed among the components of system 700 including the electronic apparatus 743. Alternatively, the system 700 can include a processing unit 744 to control activation of the one or more the acoustic transmitters 710-1 and collection of signals in receivers of the acoustic receiver array 710-2 in the tool 705 and to manage processing schemes in accordance with measurement procedures and signal processing as described herein. The processing unit 744 and/or other components of the system 700 can be configured to operate similar to or identical to any of the processing techniques taught herein.

The communications unit 745 can include communications for operation downhole. Such downhole communications can include a telemetry system. Communications unit 745 may use combinations of wired communication technologies and wireless technologies at frequencies that do not interfere with on-going measurements.

The system 700 can also include a bus 747, where the bus 747 provides electrical conductivity among the components of the system 700. The bus 747 can include an address bus, a data bus, and a control bus, each independently configured. The bus 747 can be realized using a number of different communication mediums that allows for the distribution of components of the system 700. The bus 747 can include instrumentality for network communication. The use of bus 747 can be regulated by the controller 741.

In various embodiments, peripheral devices 746 can include displays, additional storage memory, or other control devices that may operate in conjunction with the controller 741 or the memory 742. The peripheral devices 746 can be arranged with a display, as a distributed component on the surface of a well, that can be used with instructions stored in the memory 742 to implement a user interface to manage the operation of the acoustic tool 705 and/or components distributed within the system 700 and to manage the operations to perform processing of the acoustic signals to estimate formation mobility from Stoneley waveforms. Such a user interface can be operated in conjunction with the communications unit 745 and the bus 747.

Figure 8:
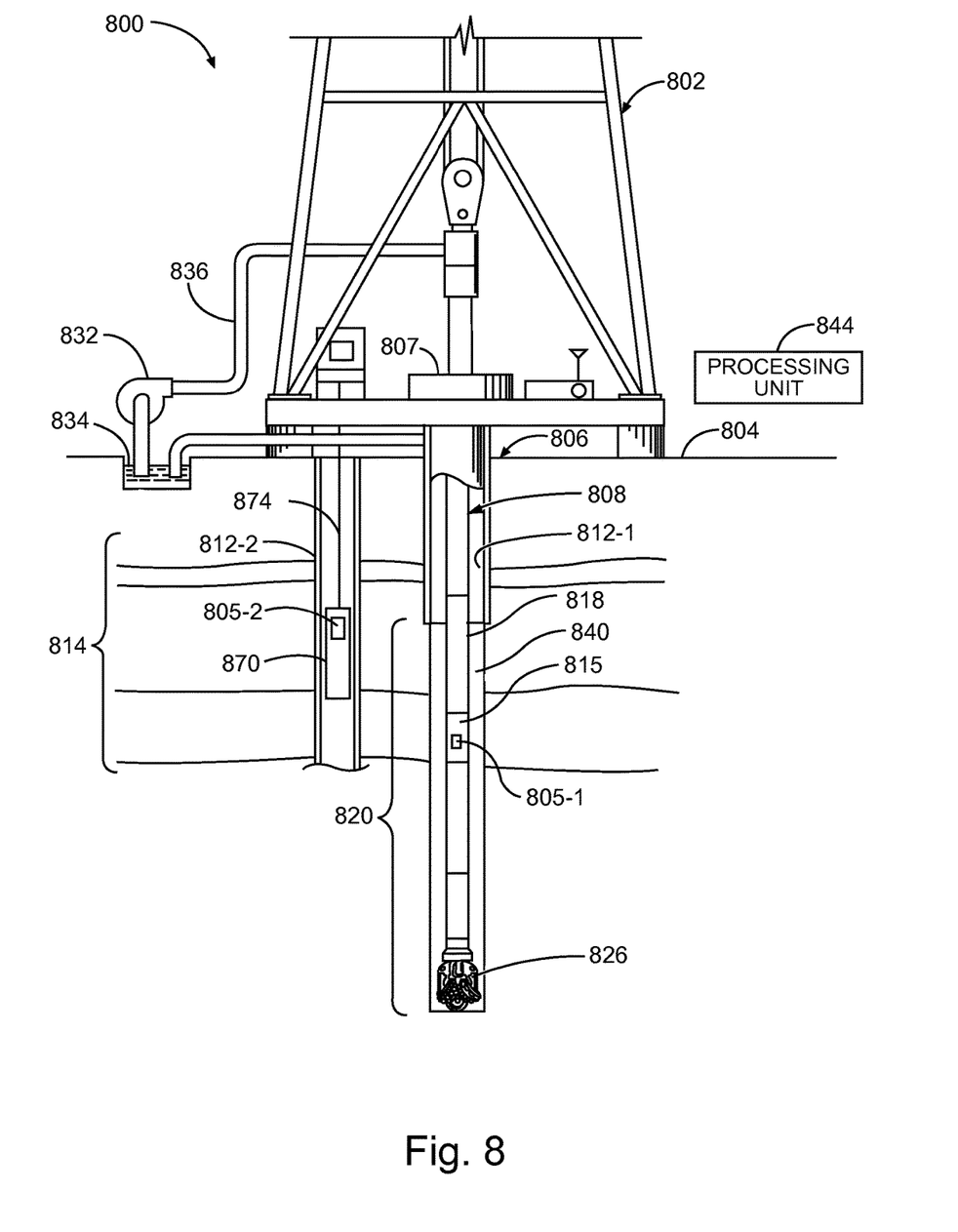
FIG. 8 depicts an embodiment of a system at a drilling site, where the system includes an acoustic measurement tool operable in conjunction with a processing scheme to estimate formation mobility from Stoneley waveforms, in accordance with various embodiments.

FIG. 8 depicts an embodiment of a system 800 at a drilling site, where the system 800 includes an acoustic measurement tool 805-1, 805-2, or both 805-1 and 805-2 configured with sensors, the sensors including one or more acoustic transmitters to generate an acoustic signal(s) and an acoustic array of receivers at which pressure waves are received in response to the generation of the acoustic signal(s). Tools 805-1 and 805-2 can be realized in a similar or identical manner to arrangements taught herein.

A control unit and processing unit of the acoustic measurement tools 805-1 and 805-2 can be distributed among system 800 or can be integrated with acoustic measurement tools 805-1 and 805-2 providing for control and analysis activities to be conducted downhole. The acoustic measurement tools 805-1 and 805-2 can be realized in a similar or identical manner to arrangements and processing discussed herein to make acoustic measurements in a borehole and to process the signals and data from the acoustic measurements to perform processing of the acoustic signals to estimate formation mobility from Stoneley waveforms from data generated from signals acquired at the acoustic measurement tools 805-1 and 805-2. A processing unit 844 may be located at a surface 804 of a well 806 to estimate formation mobility from Stoneley waveforms as taught herein.

The system 800 can include a drilling rig 802 located at the surface 804 of the well 806 and a string of drill pipes, that is, the drill string 808, connected together so as to form a drilling string that is lowered through a rotary table 807 into a wellbore or borehole 812-1. The drilling rig 802 can provide support for the drill string 808. The drill string 808 can operate to penetrate the rotary table 807 for drilling the borehole 812-1 through subsurface formations 814. The drill string 808 can include drill pipe 818 and a bottom hole assembly 820 located at the lower portion of the drill pipe 818.

The bottom hole assembly 820 can include a drill collar 815, the tool 805 attached to the drill collar 815, and a drill bit 826. The drill bit 826 can operate to create the borehole 812-1 by penetrating the surface 804 and the subsurface formations 814. The acoustic measurement tool 805-1 can be structured for an implementation in the borehole 812-1 as a measurements-while-drilling (MWD) system, such as a logging-while-drilling (LWD) system. The housing containing the acoustic measurement tool 805-1 can include electronics to activate one or more transmitters of the acoustic measurement tool 805-1 and collect responses from one or more receivers of the acoustic measurement tool 805-1. Such electronics can include a processing unit to provide formation analysis, borehole analysis, or combinations thereof to the surface over a standard communication mechanism for operating a well. Alternatively, electronics can include a communications interface to provide signals output by receivers of the acoustic measurement tool 805-1 to the surface over a standard communication mechanism for operating a well, where these output signals can be analyzed at the processing unit 844 at the surface to provide formation analysis, borehole analysis, or combinations thereof.

During drilling operations, the drill string 808 can be rotated by the rotary table 807. In addition to, or alternatively, the bottom hole assembly 820 can also be rotated by a motor (e.g., a mud motor) that is located downhole. The drill collars 815 can be used to add weight to the drill bit 826. The drill collars 815 also can stiffen the bottom hole assembly 820 to allow the bottom hole assembly 820 to transfer the added weight to the drill bit 826, and in turn, assist the drill bit 826 in penetrating the surface 804 and subsurface formations 814.

During drilling operations, a mud pump 832 can pump drilling fluid (sometimes known by those of skill in the art as "drilling mud") from a mud pit 834 through a hose 836 into the drill pipe 818 and down to the drill bit 826. The drilling fluid can flow out from the drill bit 826 and be returned to the surface 804 through an annular area 840 between the drill pipe 818 and the sides of the borehole 812-1. The drilling fluid may then be returned to the mud pit 834, where such fluid is filtered. In some embodiments, the drilling fluid can be used to cool the drill bit 826, as well as to provide lubrication for the drill bit 826 during drilling operations. Additionally, the drilling fluid may be used to remove subsurface formation 814 cuttings created by operating the drill bit 826.

In various embodiments, the acoustic measurement tool 805-2 may be included in a tool body 870 coupled to a logging cable 874 such as, for example, for wireline applications. The tool body 870 containing the acoustic measurement tool 805-2 can include electronics to activate one or more transmitters of the acoustic measurement tool 805-2 and collect responses from one or more receivers of the acoustic measurement tool 805-2. Such electronics can include a processing unit to provide formation analysis, borehole analysis, or combinations thereof to the surface over a standard communication mechanism for operating a well. Alternatively, electronics can include a communications interface to provide signals output by receivers of the acoustic measurement tool 805-2 to the surface over a standard communication mechanism for operating a well, where these output signals can be analyzed at the processing unit 844 at the surface to provide formation analysis, borehole analysis, or combinations thereof. The logging cable 874 may be realized as a wireline (multiple power and communication lines), a mono-cable (a single conductor), and/or a slick-line (no conductors for power or communications), or other appropriate structure for use in the borehole 812-2. Though, for convenience, FIG. 8 depicts both an arrangement for wireline applications and an arrangement for LWD applications, the system 800 may be also realized for one of the two applications.

In various embodiments, based on acoustic measurements of a formation, an objective function can be generated that takes into account all receivers and transmitter-receiver combinations of a stacked arrangement of receivers to reduce noise. The stacked arrangement can be arranged as multiple receivers at multiple local depths. The objective function can be generated as the norm of the difference between pressure measurements and synthetic modeled measurements with different receivers for different depths. Synthetic waveforms can be generated as a function of reflection coefficients with respect to the stacked arrangement. The objective function as used herein can provide the ability to have different transmitter to receiver gains for each one of the receivers used in the processing. In addition, the attenuation due to permeability and the intrinsic attenuation can be separated, since they behave differently at low frequencies.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
generating, by a computer system, synthetic pressure values for a test mobility and a test intrinsic attenuation of a formation, based on a synthetic model of Stoneley wave propagation through the formation, the synthetic model including effects of permeability and intrinsic attenuation on modeled Stoneley pressure waves and associated reflections within the formation;
acquiring, by the computer system from a downhole tool disposed in a borehole extending over a plurality of depths within the formation, Stoneley pressure values measured by each receiver in a receiver array of the downhole tool at each of the plurality of depths along a length of the borehole drilled within the formation;
generating, by the computer system, an objective function that represents a misfit between the Stoneley pressure values measured by each receiver of the receiver array at each of the plurality of depths and the synthetic pressure values generated using the synthetic model;
analytically minimizing, by the computer system, the objective function with respect to reflection coefficients for the test mobility and test intrinsic attenuation, wherein the test mobility and test intrinsic attenuation are repeatedly adjusted until a global minimum is obtained for the objective function;
estimating, by the computer system, formation mobility and intrinsic attenuation from the minimized objective function;
determining, by the computer system, a permeability profile of the formation as a function of depth, based on the estimated formation mobility and intrinsic attenuation; and
providing, via a display of the computer system, the permeability profile for the borehole to be drilled over additional depths within the formation.

2. The method of claim 1, wherein the receiver array of the downhole tool has a plurality of receivers at each of a plurality of planes along a length of the downhole tool.

3. The method of claim 2, wherein generating synthetic pressure values includes synthetic modeling over all depth-receiver combinations of the plurality of receivers of the downhole tool such that data points in the objective function are stacked to include effects of reflections.

4. The method of claim 3, wherein the stacked data points in the objective function reduce effects of noise when estimating the formation mobility.

5. The method of claim 2, wherein the Stoneley pressure values are measured using receivers of the plurality of receivers having different transmitter to receiver gains.

6. The method of claim 1, wherein estimating formation mobility and intrinsic attenuation includes estimating the formation mobility and intrinsic attenuation based on different frequency dependencies of the formation mobility and intrinsic attenuation.

7. The method of claim 1, wherein generating the objective function includes generating an L2 norm of the misfit as a function of reflection coefficients.

8. The method of claim 7, wherein generating the L2 norm includes generating the L2 norm as a function of frequency.

9. A machine-readable storage device having instructions stored thereon, which, when performed by a machine, cause the machine to perform operations, the operations comprising:
generating synthetic pressure values for a test mobility and a test intrinsic attenuation of a formation, based on a synthetic model of Stoneley wave propagation through the formation, the synthetic model including effects of permeability and intrinsic attenuation on modeled Stoneley pressure waves and associated reflections within the formation;
acquiring, from a downhole tool disposed in a borehole extending over a plurality of depths within the formation, Stoneley pressure values measured by each receiver in a receiver array of the downhole tool at each of the plurality of depths along a length of the borehole drilled within the formation;
generating an objective function that represents a misfit between the Stoneley pressure values measured by each receiver of the receiver array at each of the plurality of depths and the synthetic pressure values generated using the synthetic model;
analytically minimizing the objective function with respect to reflection coefficients for the test mobility and test intrinsic attenuation, wherein the test mobility and test intrinsic attenuation are repeatedly adjusted until a global minimum is obtained for the objective function;
estimating formation mobility and intrinsic attenuation from minimizing the objective function;
determining a permeability profile of the formation as a function of depth, based on the estimated formation mobility and intrinsic attenuation; and
providing, via a display, the permeability profile for the borehole to be drilled over additional depths within the formation.

10. The machine-readable storage device of claim 9, wherein the receiver array of the downhole tool has a plurality of receivers at each of a plurality of planes along a length of the downhole tool.

11. The machine-readable storage device of claim 10, wherein generating synthetic pressure values includes synthetic modeling over all depth-receiver combinations of the plurality of receivers of the downhole tool such that data points in the objective function are stacked to include effects of reflections.

12. The machine-readable storage device of claim 11, wherein the stacked data points in the objective function reduce effects of noise when estimating the formation mobility.

13. The machine-readable storage device of claim 10, wherein the Stoneley pressure values are measured using receivers of the plurality of receivers having different transmitter to receiver gains.

14. The machine-readable storage device of claim 9, wherein estimating formation mobility and intrinsic attenuation includes estimating the formation mobility and intrinsic attenuation based on different frequency dependencies of the formation mobility and intrinsic attenuation.

15. The machine-readable storage device of claim 9, wherein generating the objective function includes generating an L2 norm of the misfit as a function of reflection coefficients.

16. The machine-readable storage device of claim 15, wherein generating the L2 norm includes generating the L2 norm as a function of frequency.

17. A system comprising:
an acoustic tool disposed in a borehole extending over a plurality of depths within a formation and having a transmitter and an array of receivers;
a control unit operable to manage generation of acoustic signals from the transmitter and to manage collection of received signals at the receivers as the borehole is drilled; and
a processing unit coupled to the acoustic tool and the control unit for performing a plurality of operations, including operations to:
generate synthetic pressure values for a test mobility and a test intrinsic attenuation of the formation, based on a synthetic model of Stoneley wave propagation through the formation, the synthetic model including effects of permeability and intrinsic attenuation on modeled Stoneley pressure waves and associated reflections within the formation;
acquire, from the acoustic tool, Stoneley pressure values measured by each of the receivers of the acoustic tool at each of the plurality of depths along a length of the borehole drilled within the formation;
generate an objective function that represents a misfit between the Stoneley pressure values and the synthetic pressure values;
analytically minimize the objective function with respect to reflection coefficients for the test mobility and test intrinsic attenuation, wherein the test mobility and test intrinsic attenuation are repeatedly adjusted until a global minimum is obtained for the objective function;
estimate formation mobility and intrinsic attenuation from minimizing the objective function;
determining a permeability profile of the formation as a function of depth, based on the estimated formation mobility and intrinsic attenuation; and
providing, via a display coupled to the processing unit, the permeability profile for the borehole to be drilled over additional depths within the formation.

18. The system of claim 17, wherein the array of receivers includes a plurality of receivers at each of a plurality of planes along a length of the tool.

19. The system of claim 18, wherein the operations performed by the processing unit include operations to conduct synthetic modeling over all depth-receiver combinations of the plurality of receivers such that data points in the objective function are stacked to include effects of reflections.

20. The system of claim 19, wherein the stacked data points in the objective function reduce effects of noise when estimating the formation mobility.

21. The system of claim 18, wherein receivers of the plurality of receivers have different transmitter to receiver gains.

22. The system of claim 17, wherein the processing unit is arranged to estimate the formation mobility and intrinsic attenuation based on different frequency dependencies of the formation mobility and intrinsic attenuation.

23. The system of claim 17, wherein the objective function is structured as an L2 norm of the misfit as a function of reflection coefficients.

24. The system of claim 23, wherein the L2 norm is a function of frequency.

* * * * *

UNITED STATES PATENT AND TRADEMARK OFFICE
CERTIFICATE OF CORRECTION

PATENT NO. : 10,267,941 B2
APPLICATION NO. : 14/771311
DATED : April 23, 2019
INVENTOR(S) : Mark V. Collins and Arthur Cheng It is certified that error appears in the above-identified patent and that said Letters Patent is hereby corrected as shown below:

In the Specification

Column 8, Line 57, change "++" to -- + --

Column 8, Line 61, change "++" to -- + --

Signed and Sealed this
Fifteenth Day of October, 2019

Andrei Iancu
*Director of the United States Patent and Trademark Office*